(12) United States Patent
Dinant et al.

(10) Patent No.: US 11,299,016 B2
(45) Date of Patent: Apr. 12, 2022

(54) OUTLET DEVICE

(71) Applicant: FAURECIA INTERIEUR INDUSTRIE, Nanterre (FR)

(72) Inventors: Bruno Dinant, Saint-Brice sous Foret (FR); Ludovic Bouldron, Pontoise (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 52 days.

(21) Appl. No.: 16/207,759

(22) Filed: Dec. 3, 2018

(65) Prior Publication Data

US 2019/0168583 A1 Jun. 6, 2019

(30) Foreign Application Priority Data

Dec. 4, 2017 (DE) ............ 10 2017 011 180.4

(51) Int. Cl.
*B60H 1/34* (2006.01)
(52) U.S. Cl.
CPC ......... *B60H 1/3428* (2013.01); *B60H 1/3414* (2013.01); *B60H 2001/3478* (2013.01)
(58) Field of Classification Search
CPC .... B60H 1/345; B60H 1/3428; B60H 1/3414; B60H 2001/3478
USPC ....................................... 454/152
See application file for complete search history.

(56) References Cited

U.S. PATENT DOCUMENTS

| 3,835,759 A | 9/1974 | Lloyd |
| 4,231,513 A | 11/1980 | Vance et al. |
| 7,517,278 B2 * | 4/2009 | Sokolofsky ........ B60H 1/00514 137/865 |
| 9,163,848 B2 * | 10/2015 | Doll ...................... F24F 13/072 |
| 2014/0301832 A1 | 10/2014 | Errick et al. |
| 2014/0357178 A1 | 12/2014 | Doll et al. |
| 2014/0357179 A1 | 12/2014 | Londiche et al. |
| 2016/0200178 A1 | 7/2016 | Londiche et al. |
| 2018/0304725 A1 * | 10/2018 | Araujo Nieto ....... B60H 1/3421 |
| 2018/0334015 A1 * | 11/2018 | Doll ..................... B60H 1/345 |

FOREIGN PATENT DOCUMENTS

| DE | 10362008 | 6/2005 |
| DE | 102007019602 | 4/2007 |
| DE | 102013210053 | 5/2013 |

(Continued)

*Primary Examiner* — Avinash A Savani
*Assistant Examiner* — Ryan L Faulkner
(74) *Attorney, Agent, or Firm* — Finch & Maloney PLLC

(57) ABSTRACT

An outlet device is provided. In operation, the outlet device generates an outlet flow and includes: a housing with an inner surface forming a channel which extends between an air inlet orifice and an air outlet orifice, a first air-directing surface which together with a first inner surface section forms a first air channel, a second air-directing surface which lies contrary to the first air-directing surface and which together with a second inner surface section forms a second air channel, a first flap which is pivotable around a first adjustment axis which runs transversely the housing centerline and a second flap which is pivotable around a second adjustment axis which runs transversely the housing centerline, an adjustment device which comprises a control device and a coupling device, wherein the coupling device is actuatable by the control device and couples the pivoting motions of the first flap and the second flap.

9 Claims, 8 Drawing Sheets

(56) References Cited

FOREIGN PATENT DOCUMENTS

| | | |
|---|---|---|
| DE | 112007000934 | 3/2014 |
| DE | 102013210055 | 9/2014 |
| DE | 102015017009 | 12/2015 |
| DE | 102015017008 | 7/2017 |
| DE | 102016014132 | 5/2018 |
| DE | 102017004928 | 11/2018 |
| FR | 3054491 | 2/2018 |
| WO | 2008012882 | 1/2008 |

* cited by examiner

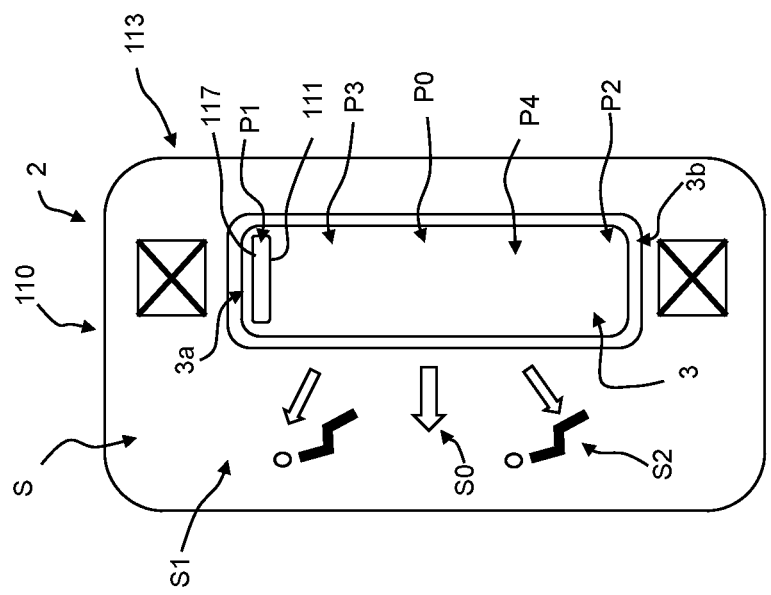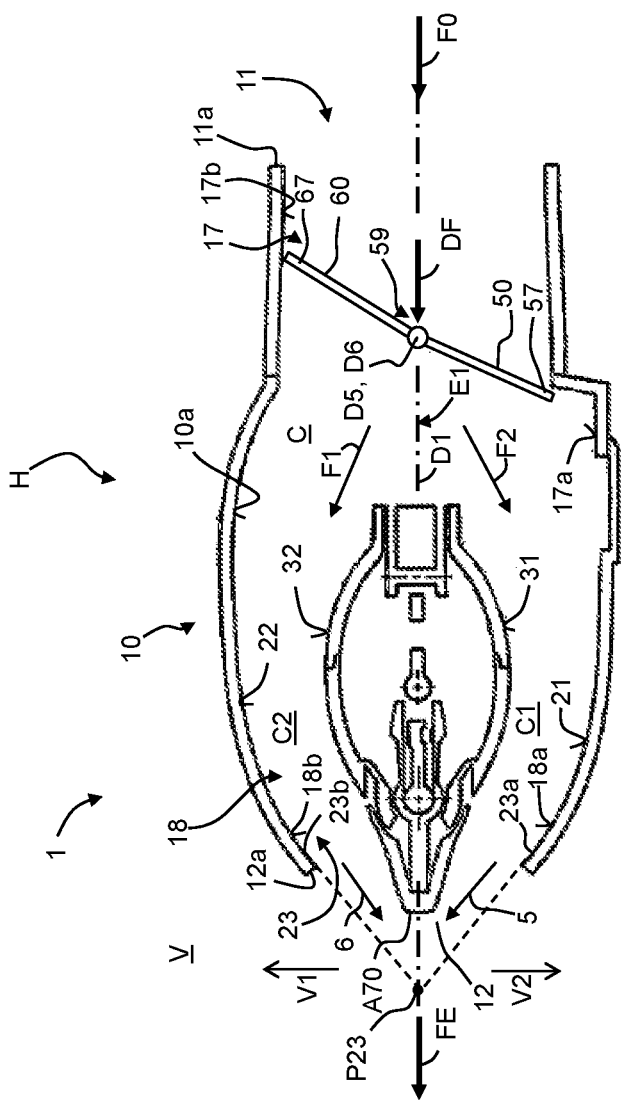
Figure 2
Figure 1

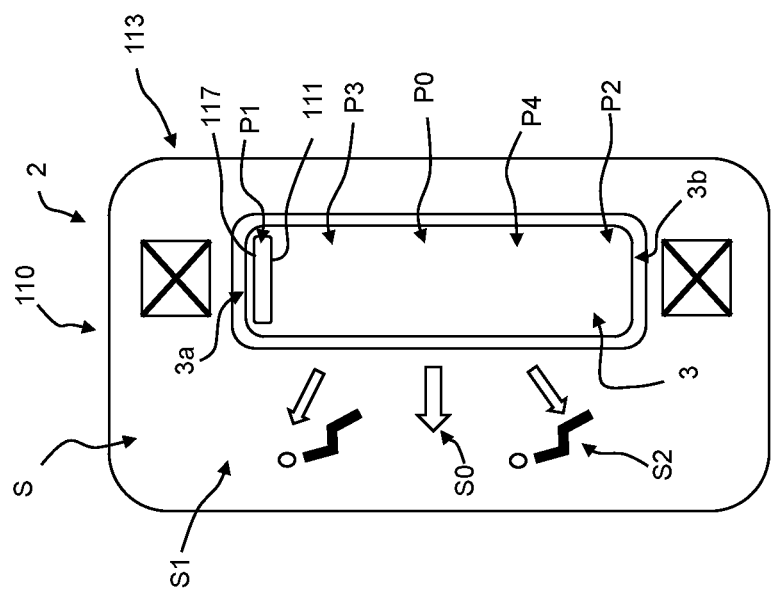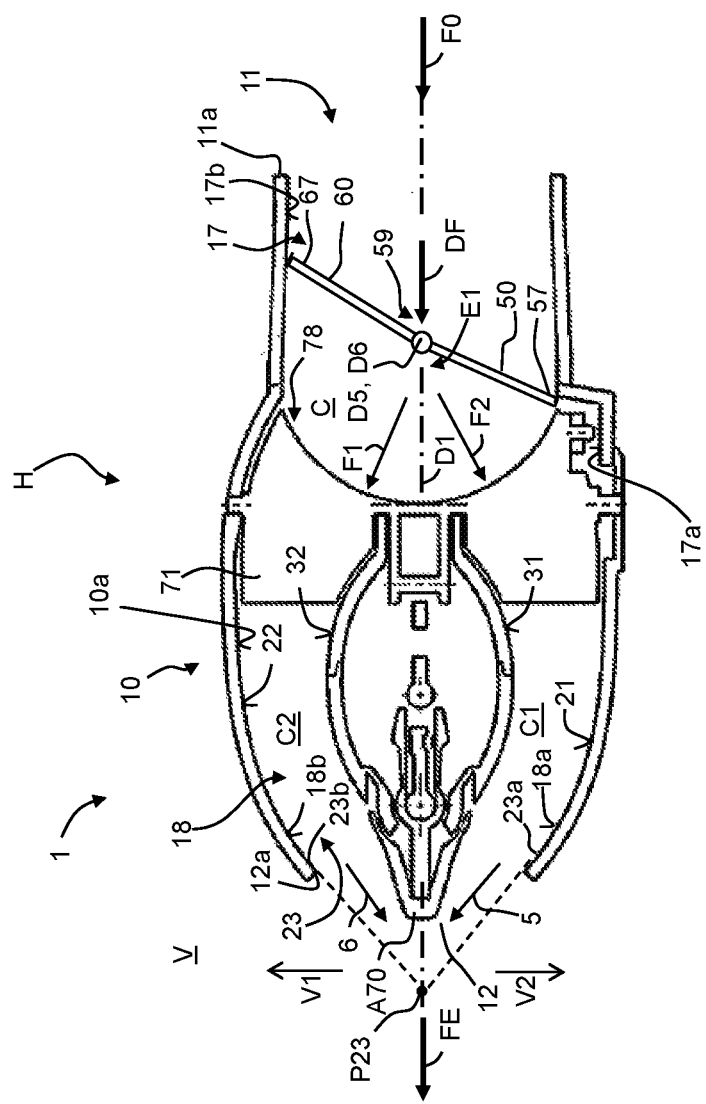
Figure 3
Figure 4

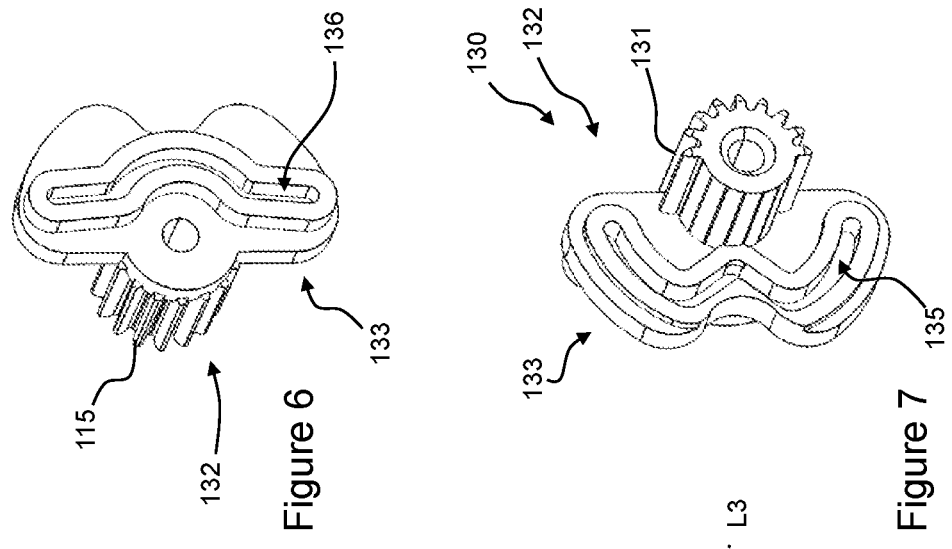
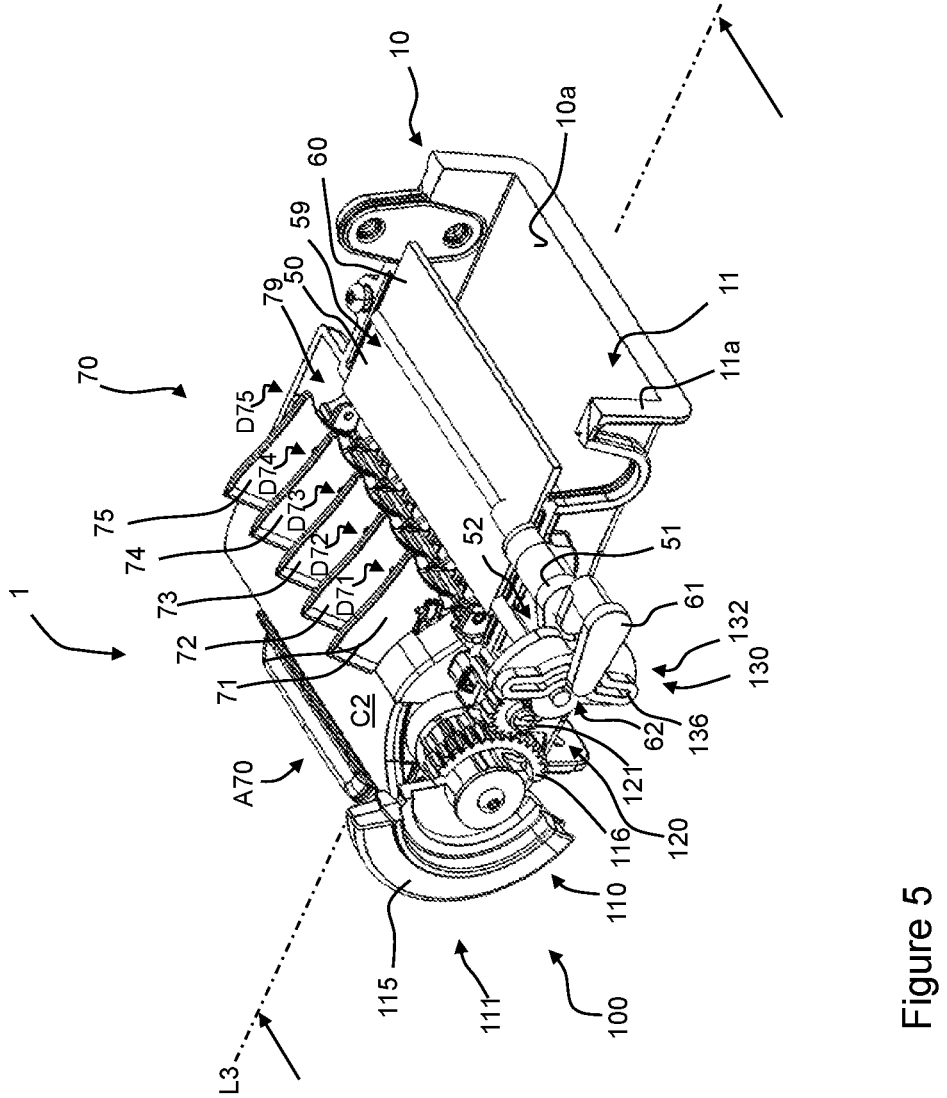

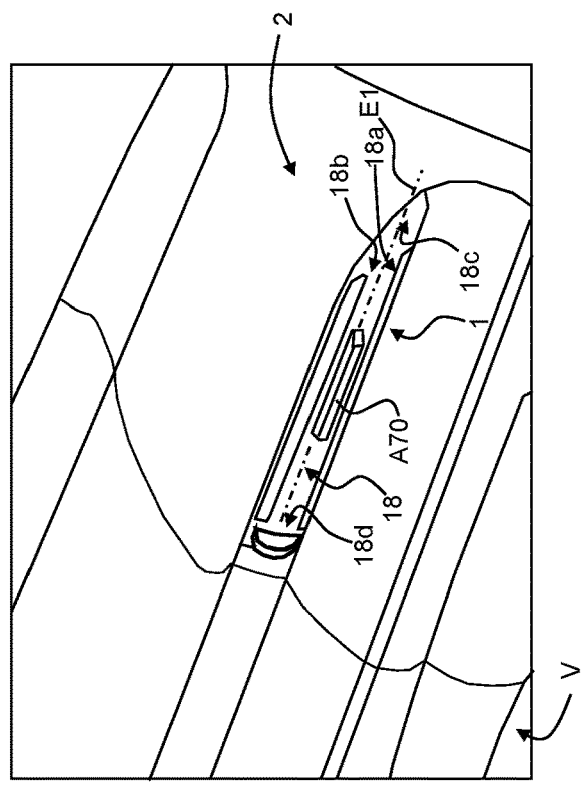
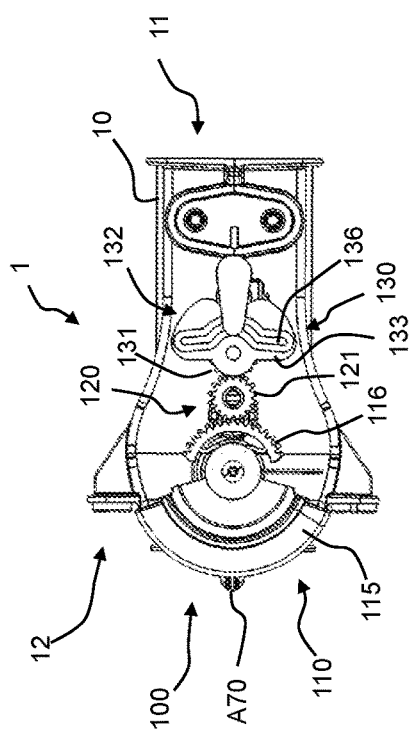
Figure 8
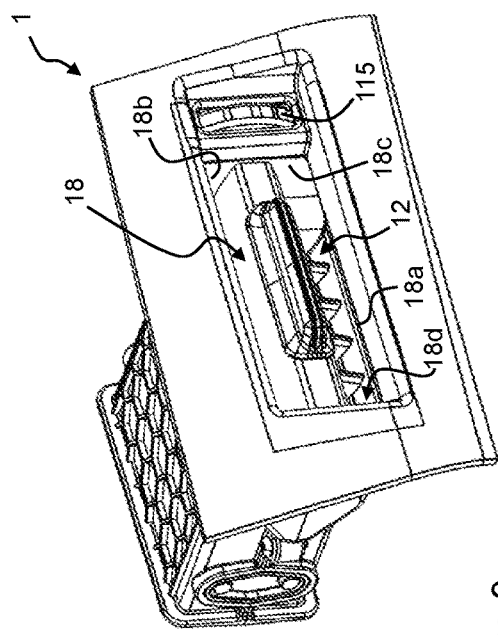
Figure 9
Figure 10

OUTLET DEVICE

RELATED APPLICATIONS

This application claims priority under 35 U.S.C. § 119 to German Application No. 10 2017 011 180.4, filed Dec. 4, 2017, which is hereby incorporated herein by reference in its entirety.

BACKGROUND

US 20140357178 A1 discloses an air vent. This application relates to an outlet device for ventilation of air in a vehicle interior.

SUMMARY

In at least one example, an outlet device is provided. The outlet device may be used for ventilation of air in a vehicle interior. The outlet device embodies by a relatively simple and space-saving design which allows easy control of the outlet flow stream generated by the outlet device.

According to one example, an outlet device for ventilation of a vehicle interior by generating an outlet flow is provided. The outlet device includes a housing with an inner surface forming a channel which extends between an air inlet orifice and an air outlet orifice, a first air-directing surface which lies opposite to a first inner surface section of the inner surface and which together with the first inner surface section forms a first air channel, wherein the first air channel defines a first partial volume flow direction at the air outlet orifice, a second air-directing surface which lies contrary to the first air-directing surface and opposite to a second inner surface section of the inner surface and which together with the second inner surface section forms a second air channel, wherein the second air channel defines a second partial volume flow direction at the air outlet orifice, a first flap which is pivotable around a first adjustment axis which runs transversely a housing centerline, wherein the first flap is disposed in front of the first and second air-directing surfaces, when viewed from the air inlet orifice, a second flap which is pivotable around a second adjustment axis which runs transversely the housing centerline, wherein the second flap is disposed in front of the first and second air-directing surfaces, when viewed from the air inlet orifice, an adjustment device which comprises a control device and a coupling device, wherein the coupling device is actuated by the control device and couples the pivoting motions of the first flap and the second flap.

In some examples of the outlet device, the disposition of the coupling device and of the first and the second flap is such that the first flap and the second flap can be pivoted such that the second flap is in front of the first flap when viewed from the air inlet orifice.

In some examples of the outlet device, additionally the coupling of the coupling device with the first and the second flap is realized such that the first flap and the second flap can be pivoted such that the second flap is in front of the first flap, when viewed from the air inlet orifice, in all positions of the second flap within the complete adjustment area of the first flap and the second flap.

In some examples, the expression "coupling two motions of two devices" means that the motion of a first one of two devices results in a motion of a second one of the two devices that is coupled to the first device. Such a coupling can be realized as a direct coupling or an indirect coupling. When the coupling of two devices is an indirect coupling, the motion of the first device is coupled to the second device via a third device that is coupled to both the first device and the second device. In this regard, a device can also be a component of a device.

It is appreciated that according to some examples, the space needed for integration of the outlet device in an inner support structure of a vehicle can be minimized.

Further, in some examples, an outlet flow of air can be generated, wherein the outlet device can be produced in a cost-effective manner. In this regard the essential parts can for example be made of plastic and can for example be produced by injection molding.

In some examples, a first flap and a second flap for regulating the outlet flow can be moved functionally in dependency of each other for directing the outlet flow and for completely closing the air vent.

In some examples, the resulting outlet flow which flows into the interior of the vehicle is generated by two partial flow components which are controlled by the first and the second flap and which are directed towards each other under an acute angle and which deflect each other before generating the resulting outlet flow. Particularly, the two partial flow components are defined as flow components which flow along each other when viewed in a direction transversely the housing centerline or the main flow direction.

In some examples, the acute angle can particularly be smaller than 90 degrees and particularly smaller than 60 degrees.

In some examples, the prolongations of the direction of the streamlines of the different partial flow components at the outlet opening meet each other in an intersection area, particularly in an intersection area of a main reference plane.

In some examples, the direction of the resulting outlet flow depends from the flow rates of the partial flow components which are influenced or controlled by the first and the second flap. In case that the flow rates of the partial flow components are equal, the direction of the resulting outlet flow is a medium direction or neutral direction or reference direction. In case that the flow rate of the flow components which flows through one of the air channels is greater than the flow rate of the flow components which flows through the other one of the air channels, the resulting outlet flow has a direction which is more inclined towards the respective other one of the air channels.

In some examples, the outlet device comprises a central body with a first and second air-directing surface lying contrary to each other with respect to a housing centerline, wherein the central body is disposed in a fixed or time-invariant position or state with respect to the housing. With this central body due to an inlet flow, two partial flow components on the two sides of the central body are generated. According to an embodiment of the outlet device, the two partial flow components, after their exit from their respective air channels, are directed towards each other under an acute angle and deflect each other.

In some examples, a movement of at least one flap in a state can be provided in which a ratio of the first volumetric flow to the second volumetric flow and thereby the direction of the outlet flow can be varied or adjusted, as the direction of the outlet flow results from the collision of the flows is delivered by two air channels which are separated from each other by the central body.

In some examples, the central body can in particular be formed that it extends completely through the inner of the housing in a direction transversely the housing centerline such that within a section along the housing centerline two air channels, a first air channel and a second air channel, are structurally separated from each other.

In some examples, the outlet device the first flap and the second flap are coupled to each other by means of a pivot bearing and wherein the first flap and the second flap are rotatably mounted to the housing.

In some examples, the coupling device comprises a first guide track in which a first engagement part of a first lever which is rotatably fixed to the first flap is movably engaged, the coupling device comprises a second guide track in which a second engagement part of a second lever which is rotatably fixed to the second flap is movably engaged, and the first guide track and the second guide track are formed on a coupling plate of the coupling device.

In some examples, the first guide track and the second guide track are formed on different surfaces of the coupling plate which are oriented contrary to each other.

In some examples, the coupling device comprises a coupling gear wheel section, which coupling gear section is coupled to the control device.

In some examples, the control device comprises a motor for actuating the coupling device.

In some examples, the control device comprises an control knob which comprises a gearwheel section, and the gearwheel section is rotatably coupled to the housing and which engages with the coupling gear wheel section of the coupling device.

In some examples, the outlet device further comprises a transmission device, wherein the coupling device is actuated by the control device via the transmission device.

In some examples, the transmission device comprises a transmission gear wheel section which is rotatably coupled to the housing and which engages a coupling gearwheel section of the coupling device and a control gearwheel section of the control device.

In some examples, the outlet device comprises at least one vertical fin which is articulated on the housing each by means of a pivot bearing and by providing a fin adjustment axis which runs transversely the first adjustment axis and the second adjustment axis.

In some examples, at least one of the at least one vertical fin can comprise an outer edge section which faces the air inlet orifice and which is formed as a concave arched section, when viewed from the air inlet orifice, in order to from a recess into which an outer edge section of the first flap which faces the at least one vertical fin extends within predetermined areas of rotational states of the first flap.

In some examples, the expression "along" with regard to a reference direction or a reference axis, particularly in the context with the indications of a specific direction or specific axis, generally means that the specific direction or axis deviates locally at least with a maximal angle of 45 degrees and preferably at a maximal angle of 23 degrees from the reference direction or reference axis.

In some examples, the expression "transversely" with regard to a reference direction or a reference axis, particularly in the context with the indications of a specific direction or specific axis, generally means that the respective direction or axis deviates locally with an angle which amounts between 45 degrees and 135 degrees and preferably with an angle which amounts between 67 degrees and 113 degrees from the reference direction or reference axis.

In some examples, the end section of the outlet flow channel is particularly defined as having a length when projected along the housing centerline which amounts to at least 1/10 and particularly at least 1/20 of smallest diameter of the inner housing surface at the air outlet opening at the second end.

In some examples, generally the direction or centerline of a component, particularly of the end section of the outlet flow channel, is the direction of the connection line of the centroids of the smallest cross-sections of the component along a reference line and, respectively, the end section along the housing centerline. In case that this connection line is a curved line, a straight line is taken for which the integral of the distances to the connection line is a minimum. The direction or centerline of a component can also be line of the center of gravity of the component.

BRIEF DESCRIPTION OF THE DRAWINGS

The foregoing and other objects, features, and advantages of the examples disclosed herein will be understood from the following detailed description in connection with the accompanying drawings, which show:

FIG. 1 is a sectional view of an embodiment of the outlet device according to an example;

FIG. 2 is schematic presentation of a control device as a front view, wherein the control device is shown in a state which corresponds with the states of two pivotable flaps as shown in FIG. 1;

FIG. 3 is a sectional view of a further embodiment of the outlet device according to an example, the further embodiment comprising vertical fins between the flaps and the central body;

FIG. 4 is schematic presentation of a control device as a front view, wherein the control device is shown in a state which corresponds with the states of the two pivotable flaps as shown in FIG. 3;

FIG. 5 is a perspective view of components of the embodiment of the outlet device according to FIG. 3, the components comprise a coupling wheel for coupling the two flaps;

FIG. 6 is a perspective view of the coupling wheel of FIG. 5 when viewed from the inner of the housing;

FIG. 7 is a perspective view of the coupling wheel of FIG. 5 when viewed from a side which lies opposed to the inner of the housing;

FIG. 8 is a side view of the embodiment of the outlet device according to FIG. 3;

FIG. 9 is a perspective front view of the housing of the embodiment of the outlet device according to FIG. 3;

FIG. 10 is a perspective view of an inner lining part of a vehicle in which an outlet device according to an example is structurally integrated;

DETAILED DESCRIPTION

Figure 11:
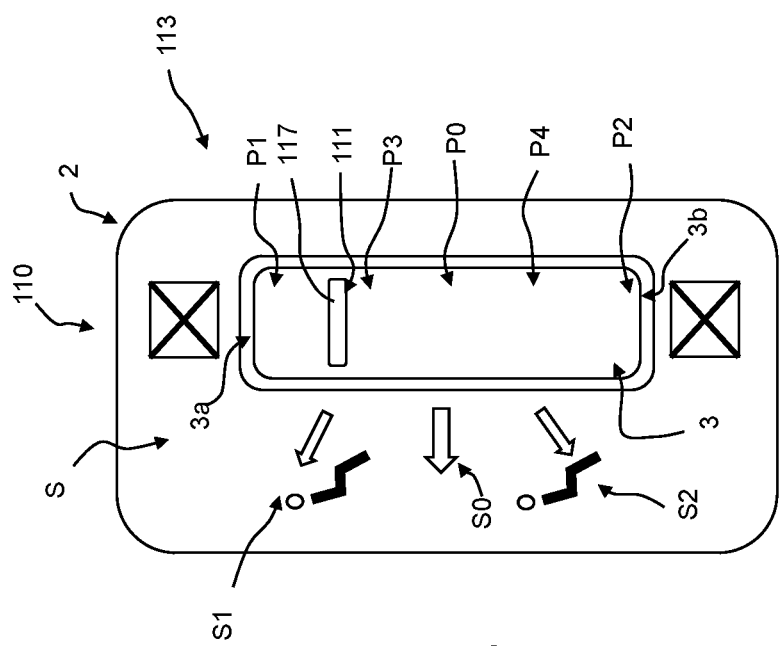
FIG. 11 is a sectional view of the embodiment of the outlet device according to FIG. 3, wherein the first and the second pivotable flap are shown in further rotational states.

An embodiment of the outlet device 1 for ventilation of a vehicle interior V of a vehicle according to an example is shown in the figures. The outlet device 1 can particularly be integrated in an inner lining part 2 (FIG. 10) or a support structure for mounting the inner lining part 2 to the vehicle. The outlet device 1 comprises a housing device H with a housing 10 having an inner air-guide surface 10a or inner surface 10a which delimits a channel C which extends along a housing centerline D1 of the housing H. Particularly the housing centerline D1 can be defined by the cross-sections of the channel C. The housing 10 with the channel C forms an air inlet orifice 11 at a first axial end 11a of the housing 10 and an air outlet orifice 12 at a second axial end 12a of the housing 10 lying contrary to the air inlet opening 11 with respect to the housing centerline D1. In this regard the housing 10 comprises an inlet section 17 which is formed by inlet section surfaces 17a, 17b as inner air-guide surfaces which lie at the inner side of the housing 10 opposed to each other when viewed transversely the housing centerline D1 and particularly in an extension direction of a reference plane E1. The housing centerline D1 lies in the reference plane E1. Further, the housing 10 comprises an outlet section 18 which is formed by outlet section surfaces 18a, 18b inner air-guide surface which lie at its inner side of the housing 10 opposed to each other when viewed transversely the housing centerline D1 and particularly in an extension direction of a reference plane E1. The reference plane E1 can be defined (a) by the housing centerline D1 and the line of the center of gravity of the cross-sectional area of the air inlet opening 11 or (b) the housing centerline D1 and the line of the center of gravity of the cross-sectional area of the air outlet orifice 12.

The inlet section surfaces 17a, 17b can be joined to the outlet section surfaces 18a, 18b when viewed in the housing centerline D1. The inlet section surfaces 17a, 17b and the outlet section surfaces 18a, 18b form the inner air guide surface 10a. The inlet section 17 forms the air inlet orifice 11 and the outlet section 18 forms the air outlet orifice 12 lying contrary to the air inlet orifice 11 with respect to the housing centerline D1. Particularly the outlet section surfaces 18a, 18b can be formed as air-guide surfaces.

The air inlet orifice 11 can be formed differently. For example, the air inlet orifice 11 can be formed oval or circular or essentially rectangular, when viewed in the direction of the housing centerline D1, and in this regard particularly rectangular with rounded edge sections instead of corners. The air inlet orifice 11 can also have an elongated shape.

In these embodiments the air outlet orifice 12 can be formed differently. For example, the air outlet orifice 12 can be formed oval or circular or essentially rectangular, when viewed in the housing centerline D1 direction, and in this regard particularly rectangular with rounded edge sections instead of corners. The air inlet orifice 11 can also have an elongated shape.

The cross-sections of the housing 10 which are defined by the inner surface 10a can also have one or more of the above-mentioned forms and can particularly be formed oval or circular or essentially rectangular, and can also have an elongated shape, when viewed in the housing centerline D1.

The outlet section 18 particularly comprises an outlet end section 23 which is part thereof and which forms the air outlet orifice 12. The outlet end section 23 is formed by inlet section surfaces 23a, 23b as inner air-guide surfaces which lie at the inner side of the housing 10 opposed to each other when viewed transversely the housing centerline D1 and particularly in an extension direction of a reference plane E1.

The inner surface 10a of the housing 10 can be formed such that directions of opposing respective circumferential sections meet each other in an intersection point P which intersection point may lie outside the housing 10 at the side of the air outlet orifice 12. In the figures two respectively opposing circumferential sections are provided with reference numerals 23a, 23b. The end section 23 can be formed such that the directions of opposing circumferential sections 23a, 23b meet each other in an intersection point P23 or intersection line in the first reference plane E1. The intersection point P23 or intersection line lies outside the housing 10 at the side of the air outlet orifice 12. In the presentation of FIG. 1, the section plane for generation of the sectional view of FIG. 1 extends vertically to the first reference plane E1.

The outlet device 1 comprises a first air-directing surface 31 which lies opposite to a first inner surface section 21 of the inner surface 10a and particularly to the outlet section surface 18a of the outlet section 18. The first air-directing surface 31 and the first inner surface section 21 form a first air channel C1, wherein the first air channel C1 defines a first partial volume flow direction 5 of an air flow at the air outlet orifice 12, when air flows through the inlet orifice 11. The outlet device 1 further comprises a second air-directing surface 32 which lies contrary to the first air-directing surface 31 and particularly contrary to the outlet section surface 18b of the outlet section 18. The first air-directing surface 31 and the outlet section surface 18b form a second air channel C2, wherein the second air channel C2 defines a second partial volume flow direction 6 of an air flow at the air outlet orifice 12, when air flows through the inlet orifice 11. In an embodiment of the outlet device 1 an inlet flow F0 flows within the inlet section 17 in a main flow direction DF and is divided by the first and second air-directing surfaces 31, 32 in a first partial flow component F1 and a second partial flow component F2 particularly within the outlet section 18.

The first air-directing surface 31 and the second air-directing surface 32 can be outer surfaces of a central body 30 which particularly can be formed as a displacement body as shown in FIG. 1. Particularly, the central body 30 is structurally fixed to the housing 10 and not movable. According to another embodiment, the central body 30 is movably coupled to the housing 10. The central body 30 can be disposed within the outlet section 18 when viewed in a direction which runs vertically or transversely the housing centerline D1. Particularly, the first and second air-directing surfaces 31, 32 can be formed as convex surfaces when viewed from the first air-directing surface 31 and from the second air-directing surface 32.

According to an embodiment of the outlet device 1 the central body 30 extends through the complete air channel C in the direction of the first reference plane E1, that is the central body 30 connects a first side wall 18c and a second side wall 18d of the outlet section 18 which lies opposed to the first side wall 18c so that the outlet section 18 forms the first air channel C1 and the second first air channel C2 as partial channels which are structurally separated from each other.

The outlet device 1 comprises a first flap 50 which is pivotable around a first adjustment axis D5 which runs transversely the housing centerline D1, wherein the first flap 50 is disposed in front of the first and second air-directing surfaces 31, 32, when viewed from the air inlet orifice 11. The outlet device 1 comprises further a second flap 60 which is pivotable around a second adjustment axis D6 which runs transversely the housing centerline D1, wherein the second flap 60 is disposed in front of the first and second air-directing surfaces 31, 32 and in front of the first flap 50, when viewed from the air inlet orifice 11. The first adjustment axis D5 and the second adjustment axis D6 can be realized as separate adjustment axes, preferably co-axially. Further, the first flap 50 or the second flap 60 is rotatably mounted on the housing 10.

According to an example, the first flap 50 and the second flap 60 can extend through the inner of the housing 10 between the first side wall 18c and the second side wall 18d of the housing 10. The lateral ends of the first flap 50 and the second flap 60 can lie close to the first side wall 18c and the second side wall 18d, respectively, and extend along the first side wall 18c and the second side wall 18d, respectively. In this regards, "close" can mean a distance value which is smaller than the average thickness of the first flap 50 or the second flap 60. Particularly, the lateral edge line of the first flap 50 and the lateral edge line of the second flap 60 can be in contact with the first side wall 18c and the second side wall 18d in the different adjustment states of the 50, 60 particularly by providing a seal on the lateral edges of the first flap 50 or the second flap 60 which run along the first side wall 18c and the second side wall 18d, respectively. Thereby, air passing between lateral edges of the first flap 50 or the second flap 60 and the first side wall 18c and the second side wall 18d, respectively, is avoided or at least reduced.

In the embodiment of FIG. 1 the first flap 50 and the second flap 60 are coupled to each other by means of a pivot bearing 59 so that first adjustment axis D5 and the second adjustment axis D6 are identical.

The outlet device 1 comprises an adjustment device 100 which is not shown in FIG. 1 and which comprises a control device 110 and a coupling device 130. The coupling device 130 couples the pivoting motions of the first flap 50 and the second flap 60. By actuation of the control device 110 the first and the second flap 50, 60 are moved relative to each other in a predefined manner. Particularly, the coupling device 130 provides a mechanical coupling of the first flap 50 and the second flap 60.

According to a further embodiment of the outlet device 1, the same comprises an adjustment device 100 which comprises a control device 110, a transmission device 120 and a coupling device 130. The coupling device 130 is actuated by the transmission device 120 particularly by a mechanical connection.

The control device 110 can be realized differently and can particularly comprise a marking or handle 117 which is moved between a first end position and a second end position with movement of the control device 110.

The adjustment device 100 can be realized such that for different essential operational states of the outlet device 1 the following positions of the marking or handle 117 in an opening 112 of the inner lining part 2 with regard to the same can be provided:
a first end position P1 on a first end 3a of the opening 3,
a second end position P2 on a second end 3b of the opening 3,
a neutral position P0 of the marking 117, wherein the neutral position P0 lies in a center between the first end position P1 and the second end position P2;
a first half position P3 on the first end 3a of the opening 3, wherein the first half position P3 lies between the first end position P1 and the neutral position P0,
a second half position P4 on the second end 3b of the opening 3, wherein the first half position P3 lies between the first end position P1 and the neutral position P0.

Figure 14:
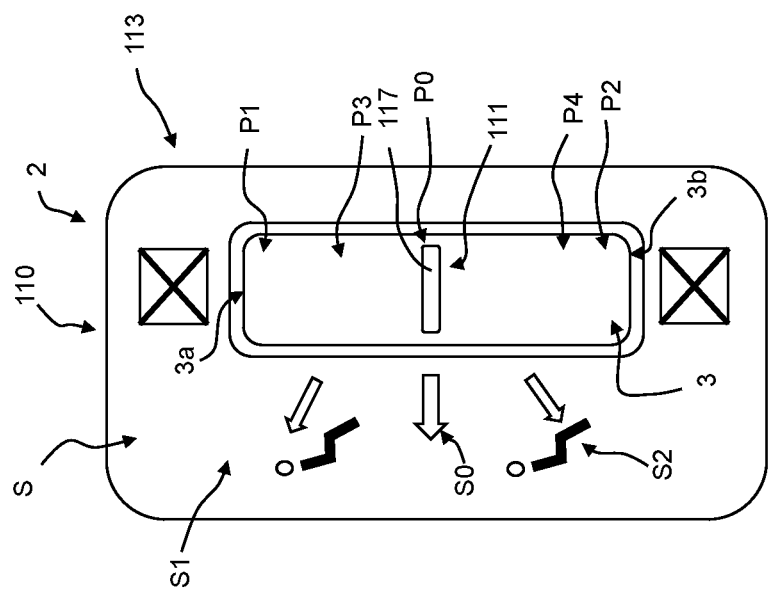
FIG. 14 is schematic presentation of a control device as a front view, wherein the control device is shown in a state which corresponds with the states of the two pivotable flaps as shown in FIG. 13.
Figure 16:
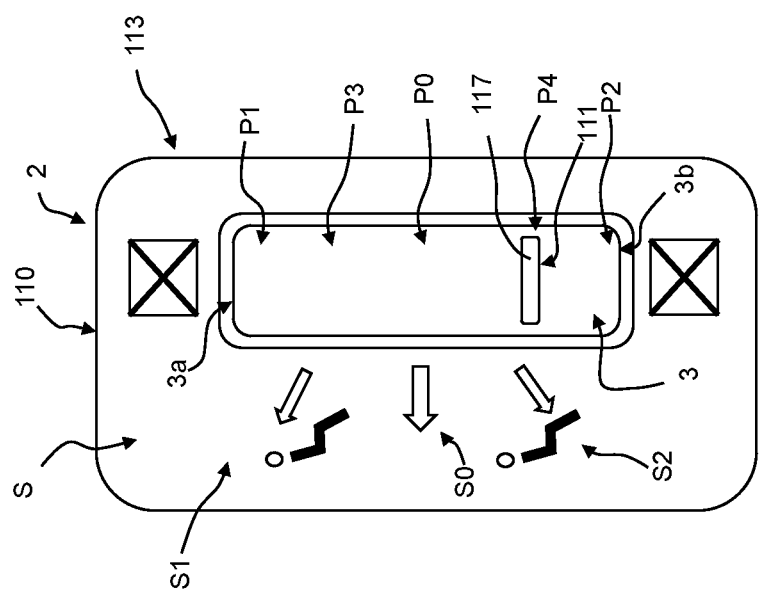
FIG. 16 is schematic presentation of a control device as a front view, wherein the control device is shown in a state which corresponds with the states of the two pivotable flaps as shown in FIG. 15.
Figure 15:
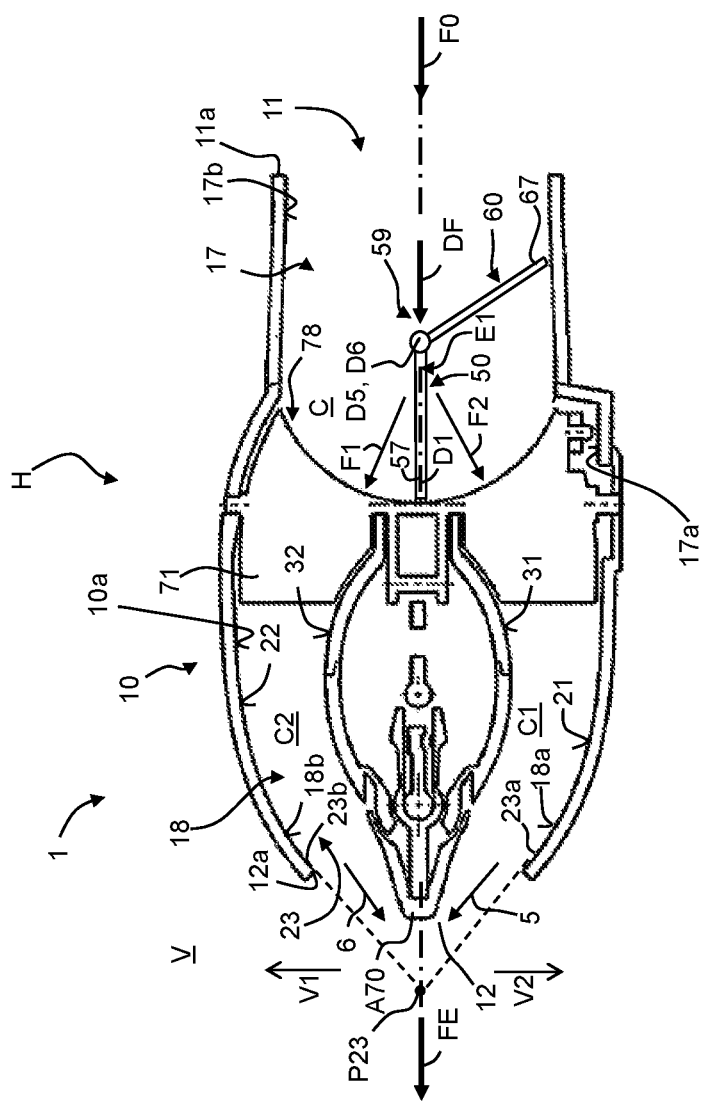
FIG. 15 is a sectional view of the embodiment of the outlet device according to FIG. 3, is wherein the first and the second pivotable flap are shown in further rotational states.
Figure 18:
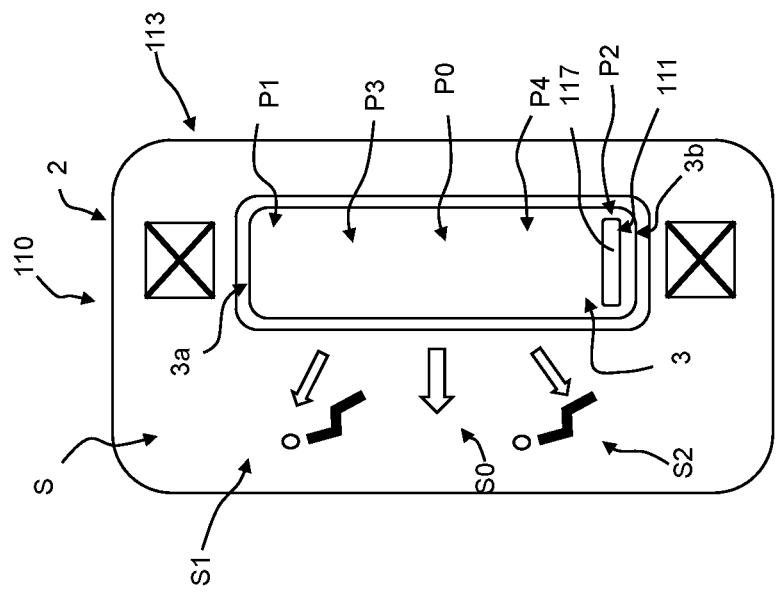
FIG. 18 is schematic presentation of a control device as a front view, wherein the control device is shown in a state which corresponds with the states of the two pivotable flaps as shown in FIG. 17.

The adjustment device 100 can be realized such
(a) that in the first end position P1 of the control device 110 or the marking 117 the first flap 50 and the second flap 60 are particularly mechanically brought in states in which the outlet device 1 an outlet flow FE due to an inlet flow F0 is blocked and in which the first flap 50 with an outer edge 57 contacts a first inlet section surface 17a and the second flap 60 with an outer edge 67 contacts a second inlet section surface 17b, wherein the first inlet section surface 17a and the second inlet section surface 17b lie opposed to each other with regard to the first reference plane E1 (FIGS. 11 and 12),
(b) that in the second end position P2 of the control device 110 or the marking 117 the first flap 50 and the second flap 60 are particularly mechanically brought in states in which the outlet device 1 an outlet flow FE due to an inlet flow F0 is blocked and in which the first flap 50 with an outer edge 57 contacts the second inlet section surface 17b and the second flap 60 with an outer edge 67 contacts the first inlet section surface 17b (FIGS. 17 and 18),
(c) that in the neutral position P0 of the control device 110 or the marking 117, which lies in the center between the first and second end positions P1, P2, the first flap 50 and the second flap 60 are in states in which both extend in the extension of the first reference plane E1 so that the outlet flow FE due to an inlet flow F0 is not reduced and is directed in a neutral direction (FIGS. 13 and 14),
(d) that in the first half position P3 of the control device 110 or the marking 117, which lies between P1 and P0, the first flap 50 and the second flap 60 are particularly mechanically brought in states in which the outlet device 1 generates an outlet flow FE due to an inlet flow F0 which has a maximum deflection in a first direction V1, in the embodiment shown, towards the second channel C2 and away from the first reference plane E1 (not shown in the figures),
(e) that in the second half position P4 of the control device 110 or the marking 117 which lies between P1 and P0, the first flap 50 and the second flap 60 are particularly mechanically brought in states in which the outlet device 1 generates an outlet flow FE due to an inlet flow F0 which has a maximum deflection in a second direction V2 towards the first channel C1 and away from the first reference plane E1 (FIGS. 15 and 16).

Figure 12:
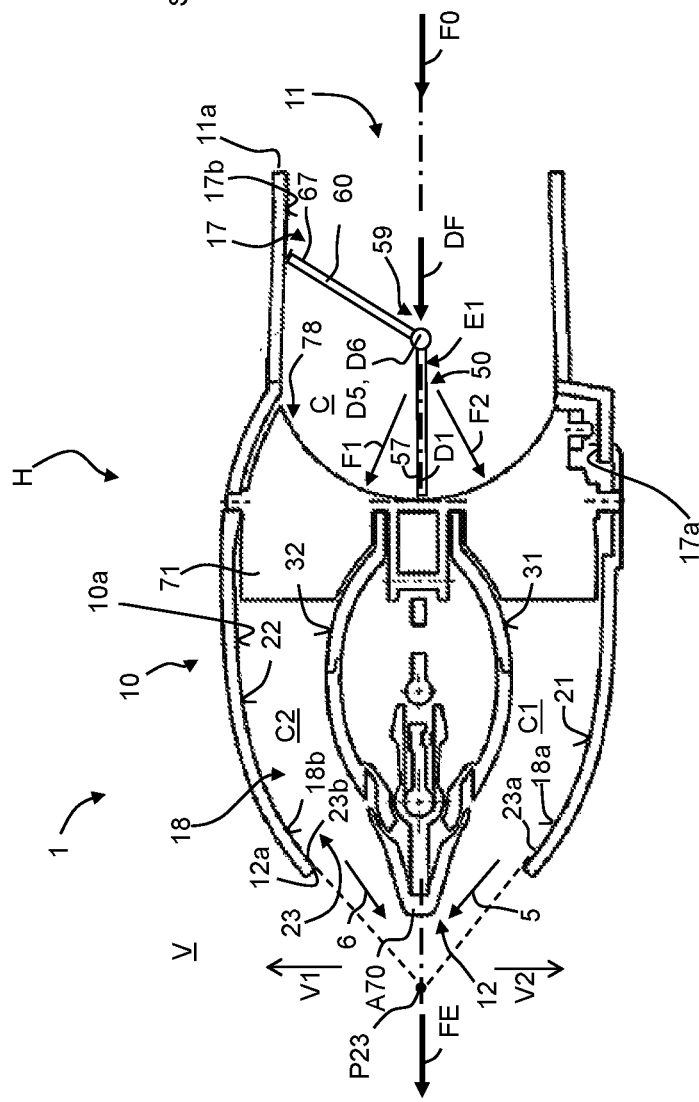
FIG. 12 is schematic presentation of a control device as a front view, wherein the control device is shown in a state which corresponds with the states of the two pivotable flaps as shown in FIG. 3.
Figure 13:
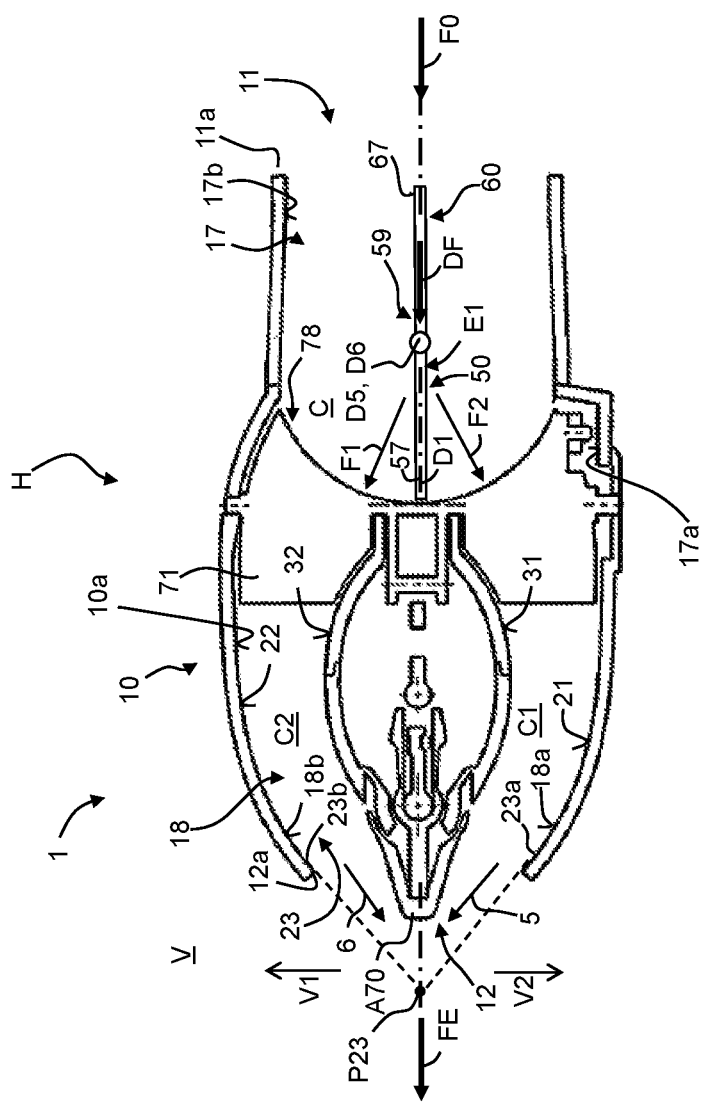
FIG. 13 is a sectional view of the embodiment of the outlet device according to FIG. 3, wherein the first and the second pivotable flap are shown in further rotational states.

An advantage of some of the embodiments of the outlet device is that the air channel is closed in two positions of the adjustment device, viz. positions P1 and P2. More in particular, the channel can be closed directly from the situation in which the flow is directed upwards as indicated in FIGS. 11 and 12 and also from the position in which the flow is directed downwards as indicated in the FIGS. 15 and 16.

FIG. 1 shows an embodiment of the outlet device 1 in an operational state in which the first flap 50 and the second flap 60 are particularly mechanically brought in closing states in which the outlet section 18 is closed so that no outlet flow FE exits the air outlet orifice 12 even if an air flow pressure or a potential air inlet flow F0 is applied to the air inlet opening 11.

In FIG. 2 a movable part of the control device 110 which is disposed at an opening 3 of the inner lining part 2 such that a marking or handle 117 of the movable part of the control device 110 can be seen from the vehicle interior V. The inner lining part 2 can comprise an indication area S in which symbols for different flow directions of the outlet flow FE are provided and particularly printed or formed. The symbols for different flow directions correspond to different positions of the marking 117 due to corresponding movements of the movable part of the control device 110. Preferably the indication area S is an edge section of the inner lining part 2 and adjoins the opening 3.

Concretely, as shown in FIG. 2, the indication area S can comprise:
- a first symbol S1 which corresponds to the first half position P3 as described above,
- a second symbol S2 which corresponds to the second half position P4 as described above,
- a third symbol S0 which corresponds to position P0 as indicated above.

The outlet device 1 can also comprise an arrangement 70 of at least one fin for directing an air outlet flow in a horizontal direction, more in particular in a direction to the right or to the left when looking in the direction of the housing centerline D1. So, the at least one fin can give the air outlet flow a component in the reference plane E1 directed away from the housing centerline D1. The at least one fin can be disposed as vertical fin. This means that the at least one fin extends vertically or at least transversely to the first reference plane E1. An embodiment of the outlet device 1 with an arrangement 70 of five vertical fins 71, 72, 73, 74, 75 is shown in FIGS. 3 to 7. Preferably, the vertical fins are pivotally mounted to the housing 10 with providing a respective fin-adjustment axis D71, D72, D73, D74, D75. The at least one respective fin-adjustment axis runs transversely and particularly vertically to the housing centerline D1, particularly additionally vertically to the first reference plane E1.

Thereby, the at least one fin is provided to deflect the inlet flow F0 in a direction which runs transversely to the housing centerline D1.

As can be seen in FIG. 3 in combination with FIG. 5 the at least one fin can extend over the central body 30 when viewed transversely the housing centerline D1. In the embodiment shown the vertical fins 71, 72, 73, 74, 75 extend partially along both sides of the central body 30 with regard to the first reference plane E1 or along the first air-directing surface 31 and along the second air-directing surface 32.

Preferable at least one of the at least one fin 71, 72, 73, 74, 75 comprises an outer edge section 78 (FIG. 3) which faces the air inlet orifice 11 is formed as a concave arched section when viewed from the air inlet orifice 11. With this concave arched section a recess is formed into which an outer edge section of the first flap 50 which faces the at least one vertical fin 71, 72, 73, 74, 75 extends within predetermined areas of rotational states of the first flap 50.

In these embodiments the recess and the first flap 50 can be disposed such that in a horizontal extension of the first flap 50 the flap extends at least to an amount of 10% of its length in the housing centerline D1 or at least 30% of the flap into the respective fin from the side of the air inlet orifice 11.

The outlet device 1 can also comprise a fin coupling device 79 by which the at least one fin is guided to rotational states. In case that the fin arrangement 70 comprises several fins, the fin coupling device 79 couples the movement of the fins. The outlet device 1 can also comprise a fin adjustment device A70 which is mechanically coupled to the fin coupling device 79. The fin adjustment device A70 can for example be realized as a lever or a protrusion which can be actuated manually.

In FIGS. 5 to 7 details of an embodiment of the adjustment device 100 according to an example are shown.

The control device 110 is realized as movable part and in particular as control wheel 111 which is rotationally coupled to the housing 10 and which comprises an actuation section or thumbwheel section 115 and a gear section 116. The thumbwheel section 115 can comprise a marking 117. The thumbwheel section 115 can extend towards the air outlet orifice 12 Further, the thumbwheel section 115 can be articulated to the housing 10 such that the thumbwheel section 115 can be rotated around a rotational axis which is directed transversely the housing axis D1.

The transmission device 120, if applicable, can be realized as a gear wheel 121 which is rotationally coupled to the housing 10 and which is in engagement with the gear section 116 of the control device 110. The transmission device 120 can also be realized as a friction wheel.

As a further alternative, the transmission device 120 can be realized as lever mechanism.

The coupling device 130 can comprise a coupling gear section 131 which is rotationally coupled to the housing 10 and which particularly can be realized as coupling wheel 132. In case that the outlet device comprises a transmission device 120, the coupling gear section 131 is in engagement with the gear wheel 121 of the transmission device 120. Alternatively, the coupling device 130 can comprise a friction wheel section which is rotationally coupled to the housing 10 and which particularly can be realized as friction wheel.

The coupling device 130 can further comprise a coupling plate 133 which particularly can comprise the coupling gear section 131 or the friction wheel section and which is rotationally fixed to the coupling gear section 131 of the transmission device 120.

The coupling device 130 can comprise a first guide track 135 and a second guide track 136. The first guide track 135 and the second guide track 136 are formed on the coupling plate 133 which is coupled to the transmission device 120 by the coupling gear section 131.

For coupling the first flap 50 to the first guide track 135 a first lever 51 is fixed to the first flap 50. The first lever 51 comprises a first engagement part 52 which is in engagement with the first guide track 135. Further, for coupling the second flap 60 to the second guide track 60 a second lever 61 is fixed to the second flap 60 and comprises a second engagement part 62 which is in engagement with the second guide track 135.

In the embodiment shown in FIGS. 5 to 7, the first guide track 135 and the second guide track 136 are formed on different surfaces of the coupling plate 133, and in particular on different surfaces of the coupling wheel 132, wherein the respective surfaces are oriented contrary to each other. Thereby, a space-saving solution is provided.

Figure 17:
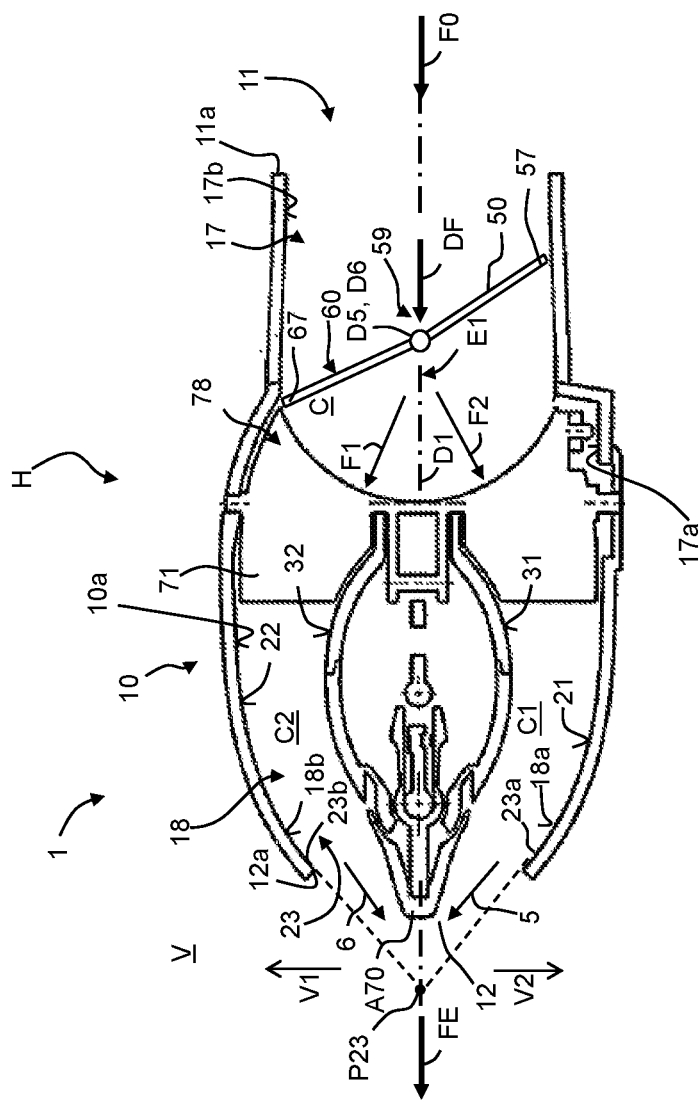
FIG. 17 is a sectional view of the embodiment of the outlet device according to FIG. 3, wherein the first and the second pivotable flap are shown in further rotational states.

For operating the outlet device 1 and controlling the operational state of the same, the thumbwheel section 115 and optionally together with the marking 117 is rotated by a user. The closing position of the flaps 50, 60 is shown in FIGS. 1, 3, and 17.

With the adjustment device 100 and in particular with the first guide track 50 and the second guide track 60 shown in FIGS. 5 to 7, the positions P0, P1, P2, P3, P4 of the marking 117 mean an operational state of the outlet device 1 as shown in the figures.

The invention claimed is:

1. An outlet device for ventilation of a vehicle interior by generating an outlet flow, the outlet device comprising:
   a housing with an inner surface forming a channel which extends between an air inlet orifice and an air outlet orifice;
   a first air-directing surface which lies opposite to a first inner surface section of the inner surface and which together with the first inner surface section forms a first air channel, wherein the first air channel defines a first partial volume flow direction at the air outlet orifice;
   a second air-directing surface which lies contrary to the first air-directing surface and opposite to a second inner surface section of the inner surface and which together with the second inner surface section forms a second air channel, wherein the second air channel defines a second partial volume flow direction at the air outlet orifice;
   a first flap which is pivotable around a first adjustment axis which runs transversely to a housing centerline, wherein the first flap is disposed in front of the first and second air-directing surfaces when viewed from the air inlet orifice;
   a second flap which is pivotable around a second adjustment axis which runs transversely to the housing centerline, wherein the first adjustment axis and the second adjustment axis are co-axial to each other, and wherein the second flap is disposed in front of the first and second air-directing surfaces when viewed from the air inlet orifice;
   an adjustment device which comprises a control device and a coupling device which is actuatable by the control device and couples pivoting motions of the first flap and the second flap, such that the first flap and the second flap are movable relative to each other in a predefined manner, wherein the coupling device comprises a single coupling plate, a first guide track on a first surface of the single coupling plate, and a second guide track on a second surface of the single coupling plate, the second surface of the single coupling plate orientated contrary to the first surface of the single coupling plate;
   a first lever rotatably fixed to the first flap and having a first engagement part that is engaged with the first guide track; and
   a second lever rotatably fixed to the second flap and having a second engagement part that is engaged with the second guide track.

2. The outlet device according to claim 1, wherein the first flap and the second flap are coupled to each other by a pivot bearing and wherein the first flap and the second flap are rotatably mounted to the housing.

3. The outlet device according to claim 1, wherein the coupling device comprises a gear wheel which is coupled to the control device.

4. The outlet device according to claim 1, wherein the control device comprises a handle or thumbwheel for actuating the coupling device.

5. The outlet device according to claim 1, wherein the coupling device comprises a coupling gear section, wherein the coupling gear section is rotatably coupled to the housing and engages with a gear wheel of the coupling device.

6. The outlet device according to claim 1, further comprising a transmission device, wherein the coupling device is actuatable by the control device via the transmission device.

7. The outlet device according to claim 1, further comprising a transmission device, wherein the coupling device is actuatable by the control device via the transmission device and wherein the transmission device comprises a transmission gear wheel section which is rotatably coupled to the housing and which engages a gear wheel of the coupling device and a gear section of the control device.

8. The outlet device according to claim 1, further comprising one or more vertical fins which is pivotally mounted to the housing and a fin adjustment axis which runs transversely the first adjustment axis and the second adjustment axis.

9. The outlet device according to claim 8, wherein at least one of the one or more vertical fins comprises an outer edge section which faces the air inlet orifice and which is formed as a concave arched section when viewed from the air inlet orifice to form a recess into which an outer edge section of the first flap, which faces the at least one vertical fin, extends within predetermined areas of rotational states of the first flap.

* * * * *